US011488043B2

(12) United States Patent
Lada et al.

(10) Patent No.: US 11,488,043 B2
(45) Date of Patent: Nov. 1, 2022

(54) SYSTEMS AND METHODS FOR PROVIDING DATA ANALYSIS BASED ON APPLYING REGRESSION

(71) Applicant: META PLATFORMS, INC., Menlo Park, CA (US)

(72) Inventors: Akos Lada, San Francisco, CA (US); Alexander Peysakhovich, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1435 days.

(21) Appl. No.: 15/147,805

(22) Filed: May 5, 2016

(65) Prior Publication Data
US 2017/0323215 A1 Nov. 9, 2017

(51) Int. Cl.
*G06N 7/00* (2006.01)
*G06N 20/00* (2019.01)

(52) U.S. Cl.
CPC .............. *G06N 7/005* (2013.01); *G06N 20/00* (2019.01)

(58) Field of Classification Search
CPC .............................. G06N 7/005; G06N 20/00
USPC ........................................................ 706/12
See application file for complete search history.

(56) References Cited

U.S. PATENT DOCUMENTS

| 2002/0161664 | A1* | 10/2002 | Shaya | G06Q 30/0254 705/7.31 |
| 2011/0289590 | A1* | 11/2011 | Miettinen | G06Q 30/02 726/26 |
| 2013/0304686 | A1* | 11/2013 | Antin | G06Q 30/02 706/46 |
| 2015/0066594 | A1* | 3/2015 | Li | G06Q 30/0202 705/7.31 |
| 2016/0162797 | A1* | 6/2016 | Thorpe | A61B 5/4839 706/52 |

OTHER PUBLICATIONS

Chaney et al., "A Probabilistic Model for Using Social Networks in Personalized Item Recommendation", Proceedings of the 9th ACM Conference on Recommender Systems, Sep. 2015 (Year: 2015) (Year: 2015).*
Sarwar et al., "Item-Based Collaborative Filtering Recommendation Algorithms", World Wide Web 2001 (Year: 2001).*

(Continued)

*Primary Examiner* — Tsu-Chang Lee
(74) *Attorney, Agent, or Firm* — Sheppard Mullin Richter & Hampton LLP

(57) ABSTRACT

Systems, methods, and non-transitory computer-readable media can acquire a set of individual time series associated with a set of users. Each of the individual time series can be associated with a respective user out of the set of the users. A plurality of variables represented via the set of individual time series can be selected. The plurality of variables can include at least a first variable and a second variable. One or more regression techniques can be applied to at least the first variable and the second variable. A set of sensitivity metrics for the set of users can be determined based on the one or more regression techniques. A respective sensitivity metric out of the set of sensitivity metrics can be determined for each of the users.

15 Claims, 9 Drawing Sheets

(56) References Cited

OTHER PUBLICATIONS

Karmaker et al., "A Fine Grained Technique for Viral Marketing based on Social Network: A Machine Learning Approach", International Journal on Science and Technology, vol. 1, No. 2, Aug. 2011 (Year: 2011).*

Amichai-Hamburger et al., "Social network user and personality", Computers in Human Behavior, 26 (2010) 1289-1295 (Year: 2010).*

* cited by examiner

SYSTEMS AND METHODS FOR PROVIDING DATA ANALYSIS BASED ON APPLYING REGRESSION

FIELD OF THE INVENTION

The present technology relates to the field of data analysis. More particularly, the present technology relates to techniques for providing data analysis based on applying regression.

BACKGROUND

Today, people often utilize computing devices (or systems) for a wide variety of purposes. Users can use their computing devices to, for example, interact with one another, access content, share content, and create content. In some cases, users can utilize their computing devices to view, access, interact, or otherwise engage with content, such as multimedia (i.e., media) or other content. For instance, by utilizing their computing devices, users of a social networking system or service can support (e.g., like, up-vote), share, comment on, click on, or otherwise engage with posts within the social networking system or service.

In some cases, various types of data, such as information associated with usage patterns or user behavior, can be determined, computed, gathered, or acquired. Such data can be utilized to make predictions or perform analyses associated with the social networking system (or service), such as predictions regarding how certain users may behave with respect to the social networking system. However, conventional approaches specifically arising in the realm of computer technology can, in many instances, be inefficient, ineffective, or inaccurate. Accordingly, conventional approaches can create challenges for or reduce the overall experience associated with utilizing, accessing, or interacting with online resources, such as social networking systems.

SUMMARY

Various embodiments of the present disclosure can include systems, methods, and non-transitory computer readable media configured to acquire a set of individual time series associated with a set of users. Each of the individual time series can be associated with a respective user out of the set of the users. A plurality of variables represented via the set of individual time series can be selected. The plurality of variables can include at least a first variable and a second variable. One or more regression techniques can be applied to at least the first variable and the second variable. A set of sensitivity metrics for the set of users can be determined based on the one or more regression techniques. A respective sensitivity metric out of the set of sensitivity metrics can be determined for each of the users.

In an embodiment, a set of feature values for a set of features associated with the set of users can be acquired. Machine learning can be applied to the set of feature values and the set of sensitivity metrics to develop a sensitivity model. One or more target users can be identified based on the sensitivity model.

In an embodiment, each target user out of the one or more target users can be identified based on a respective set of particular feature values associated with each target user.

In an embodiment, the sensitivity model can be indicative of one or more correlations between the set of features and the set of sensitivity metrics.

In an embodiment, the set of features can be associated with at least one of a social networking utilization feature, a page inventory feature, a page like feature, a page access amount feature, a location feature, or a device feature.

In an embodiment, one or more social networking policies can be applied to the one or more target users.

In an embodiment, the one or more social networking policies can be associated with at least one of receiving page suggestions, ranking feed content, interacting with posts, generating posts, interacting with advertisements, or developing social connections.

In an embodiment, each of the individual time series associated with the respective user out of the set of the users can include social networking behavioral data that is personalized for the respective user over a specified moving time frame.

In an embodiment, each sensitivity metric out of the set of sensitivity metrics can correspond to a respective regression coefficient, for each user out of the set of users, that represents one or more correlations between at least the first variable and the second variable.

In an embodiment, the one or more regression techniques can include one or more linear regression processes.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
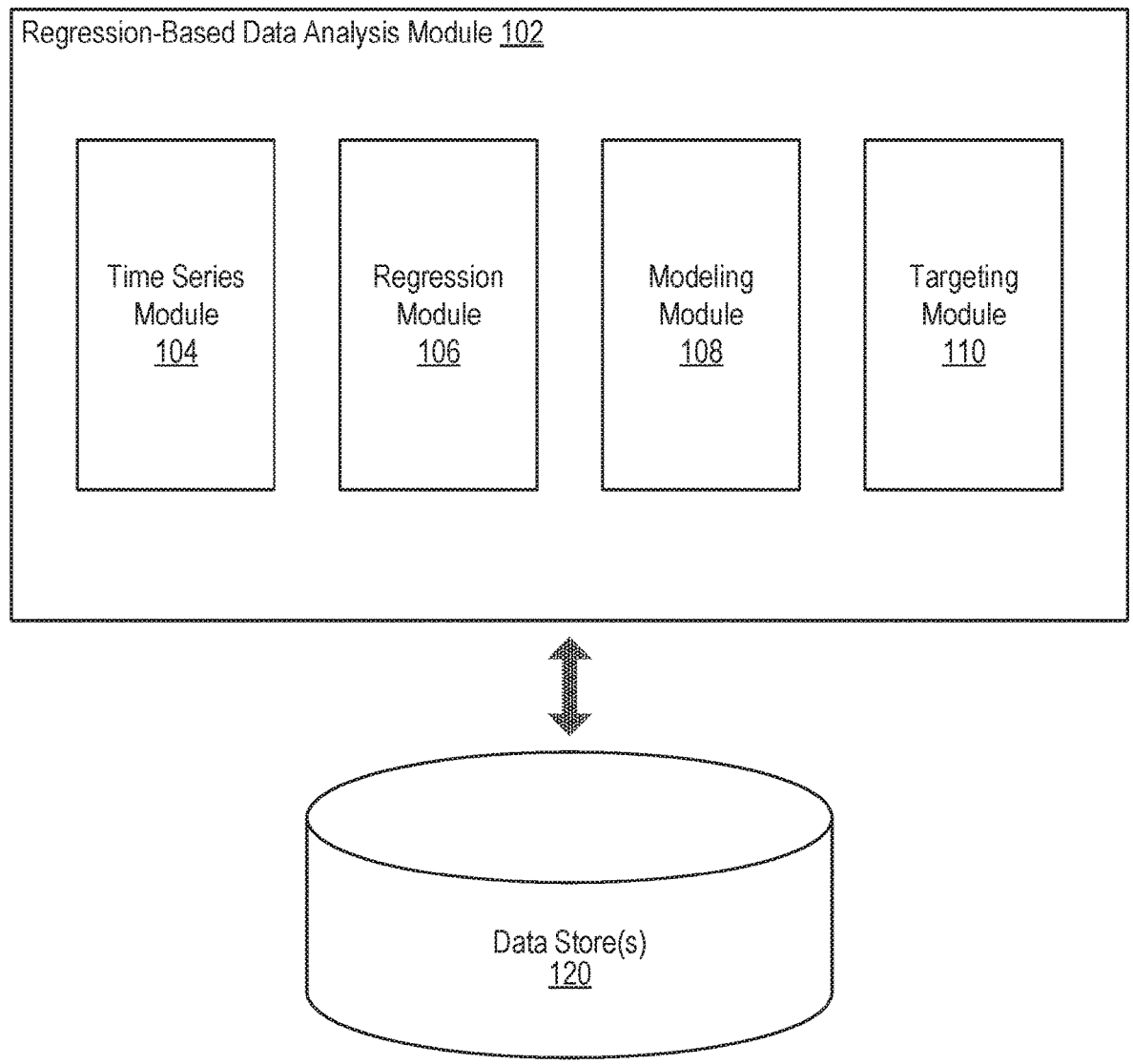
FIG. 1 illustrates an example system including an example regression-based data analysis module configured to facilitate providing data analysis based on applying regression, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein. It should be understood that all examples herein are provided for illustrative purposes and that there can be many variations or other possibilities associated with the disclosed technology.

DETAILED DESCRIPTION

Providing Data Analysis Based on Applying Regression

People use computing systems (or devices) for various purposes. Users can utilize their computing systems to establish connections, engage in communications, interact with one another, and/or interact with various types of content. In some cases, computing devices can be utilized by users of an online resource, such as a social networking system (or service). In one example, users of the social networking system can access content within the social networking system via computing devices. In this example, the users can interact or otherwise engage with content (e.g., posts) within the social networking system, such as by supporting (e.g., liking, up-voting, etc.), sharing, saving (e.g., bookmarking, downloading, etc.), commenting on, and/or clicking on content posted or surfaced via the social networking system.

In many cases, conventional approaches specifically arising in the realm of computer technology can attempt to determine, gather, or otherwise acquire data associated with the social networking system. For instance, conventional approaches can acquire data about how users engage or interact with content within the social networking system, in attempt to make predictions or to conduct analyses associated with the social networking system. In another instance, conventional approaches can analyze acquired data in attempt to decide whether or not to suggest pages to users. In a further instance, conventional approaches can analyze acquired data in attempt to determine whether or not to surface certain content items to certain users. However, such conventional approaches specifically arising in the realm of computer technology can, in many cases, be inaccurate, inefficient, or unreliable.

Due to these or other concerns, conventional approaches specifically arising in the realm of computer technology can be disadvantageous or problematic. Therefore, an improved approach rooted in computer technology that overcomes the foregoing and other disadvantages associated with conventional approaches can be beneficial. Based on computer technology, the disclosed technology can provide data analysis based on applying regression, such as by applying one or more regression techniques to a set of one or more individual time series. Various embodiments of the present disclosure can acquire a set of individual time series associated with a set of users. Each of the individual time series can be associated with a respective user out of the set of the users. A plurality of variables represented via the set of individual time series can be selected. The plurality of variables can include at least a first variable and a second variable. One or more regression techniques can be applied to at least the first variable and the second variable. A set of sensitivity metrics for the set of users can be determined based on the one or more regression techniques. A respective sensitivity metric out of the set of sensitivity metrics can be determined for each of the users. It is contemplated that there can be many variations and/or other possibilities associated with the disclosed technology.

FIG. 1 illustrates an example system 100 including an example regression-based data analysis module 102 configured to facilitate providing data analysis based on applying regression, according to an embodiment of the present disclosure. As shown in the example of FIG. 1, the regression-based data analysis module 102 can include a time series module 104, a regression module 106, a modeling module 108, and a targeting module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the regression-based data analysis module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the regression-based data analysis module 102 can be implemented, in part or in whole, as software running on one or more computing devices or systems, such as on a user or client computing device. For example, the regression-based data analysis module 102 or at least a portion thereof can be implemented as or within an application (e.g., app), a program, an applet, or an operating system, etc., running on a user computing device or a client computing system, such as the user device 610 of FIG. 6. In another example, the regression-based data analysis module 102 or at least a portion thereof can be implemented using one or more computing devices or systems which can include one or more servers, such as network servers or cloud servers. In some instances, the regression-based data analysis module 102 can, in part or in whole, be implemented within or configured to operate in conjunction with a social networking system (or service), such as the social networking system 630 of FIG. 6. It should be appreciated that there can be many variations or other possibilities.

The time series module 104 can be configured to facilitate acquiring a set of individual time series associated with a set of users. Each of the individual time series can be associated with a respective user out of the set of the users. In some cases, each of the individual time series associated with the respective user out of the set of the users can include social networking behavioral data that is personalized for the respective user over a specified moving time frame. For instance, each individual time series can correspond to data points that represent or are associated with usage patterns or user behavior for a particular user of a social networking system. In this instance, the data points for the particular user can be observed, recorded, collected, or otherwise acquired over the past 90 days.

The time series module 104 can also be configured to facilitate selecting a plurality of variables represented via the set of individual time series. The plurality of variables can include at least a first variable and a second variable. In some embodiments, the first variable and the second variable can be controllable, observable, modifiable, or otherwise capable of being processed or handled by the social networking system. The disclosed technology can provide data analysis by determining or predicting, on a personalized/ individualistic basis, how one variable affects the other.

In one example, the first variable can represent an amount of posts made by social networking pages to which a particular user is connected (e.g., has liked, is a fan of, etc.), while the second variable can represent an amount of time the particular user spends on the social networking system. In this example, if the disclosed technology determines or predicts that a likelihood (e.g., confidence score) of the particular user spending more time on the social networking system will increase when the amount of posts made by those social networking pages increases, then the disclosed technology can target the particular user as a candidate to whom one or more pages of potential interest/relevance are suggested. In another example, the first variable can represent an amount of posts that are surfaced or presented (e.g., via a feed) to a particular user, while the second variable can represent an amount of social engagement (e.g., comments, likes, shares, etc.) provided by the particular user. In this example, if the disclosed technology determines or predicts that a likelihood of the particular user providing social engagement will increase when the amount of posts that are presented to him/her increases, then the disclosed technology can target the particular user as a candidate to whom more posts (or more posts that are of a similar type) are presented. It is contemplated that all examples herein are provided for illustrative purposes and that many variations associated with the disclosed technology are possible.

Moreover, the regression module 106 can be configured to facilitate applying one or more regression techniques to at least the first variable and the second variable. The regression module 106 can be further configured to facilitate determining, based on the one or more regression techniques, a set of sensitivity metrics for the set of users. A respective sensitivity metric out of the set of sensitivity metrics can be determined for each of the users. More details regarding the regression module 106 will be provided below with reference to FIG. 2A.

In addition, the modeling module 108 can be configured to facilitate acquiring a set of feature values for a set of features associated with the set of users. The modeling module 108 can be further configured to facilitate applying machine learning to the set of feature values and the set of sensitivity metrics to develop a sensitivity model. The modeling module 108 will be discussed in more detail below with reference to FIG. 2B.

Furthermore, the targeting module 110 can be configured to facilitate identifying, based on the sensitivity model, one or more target users. The targeting module 110 can also be configured to facilitate applying one or more social networking policies to the one or more target users. The targeting module 110 will be discussed in more detail below with reference to FIG. 2C.

Additionally, in some embodiments, the regression-based data analysis module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the regression-based data analysis module 102. Again, it is contemplated that there can be many variations or other possibilities associated with the disclosed technology.

Figure 2A:
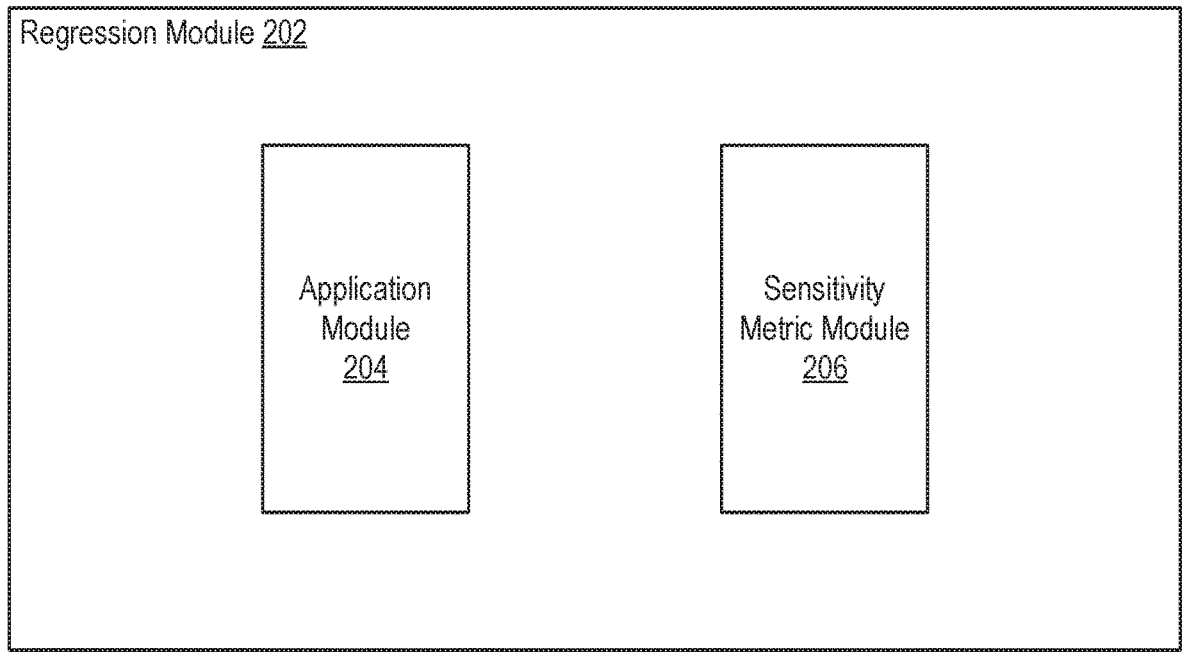
FIG. 2A illustrates an example regression module configured to facilitate providing data analysis based on applying regression, according to an embodiment of the present disclosure.

FIG. 2A illustrates an example regression module 202 configured to facilitate providing data analysis based on applying regression, according to an embodiment of the present disclosure. In some embodiments, the regression module 106 of FIG. 1 can be implemented as the example regression module 202. As shown in FIG. 2A, the regression module 202 can include an application module 204 and a sensitivity metric module 206.

As discussed previously, the regression module 202 can be configured to facilitate applying one or more regression techniques to at least a first variable and a second variable, included with an acquired set of individual time series. In some implementations, the regression module 202 can utilize the application module 204 to facilitate applying the one or more regression techniques to at least the first variable and the second variable. In one example, the application module 204 can be configured to apply one or more linear regression processes to the at least the first variable and the second variable.

Furthermore, the regression module 202 can be configured to facilitate determining, based on the one or more regression techniques, a set of sensitivity metrics for a set of users, as discussed above. In some embodiments, the regression module 202 can utilize the sensitivity metric module 206 to calculate, derive, produce, or otherwise determine the set of sensitivity metrics for the set of users. A respective sensitivity metric out of the set of sensitivity metrics can be determined, calculated, derived, or provided, etc., by the sensitivity metric module 206, for each of the users. In some embodiments, each sensitivity metric out of the set of sensitivity metrics can correspond to a respective regression coefficient, for each user out of the set of users, that represents one or more correlations between at least the first variable and the second variable. For instance, a particular sensitivity metric can indicate or represent how sensitive a particular user is with respect to the first variable and the second variable. In this instance, the particular sensitivity metric can be utilized to determine or predict, for the particular user, how changes to one variable can affect the other variable. Based on analyzing or otherwise utilizing such determinations or predictions, the disclosed technology can decide whether or not to provide or suggest certain content (e.g., videos, images, text, pages, ads, etc.) to the particular user. It should be appreciated that all examples herein are provided for illustrative purposes and that there can be many variations or other possibilities associated with the disclosed technology.

Figure 2B:
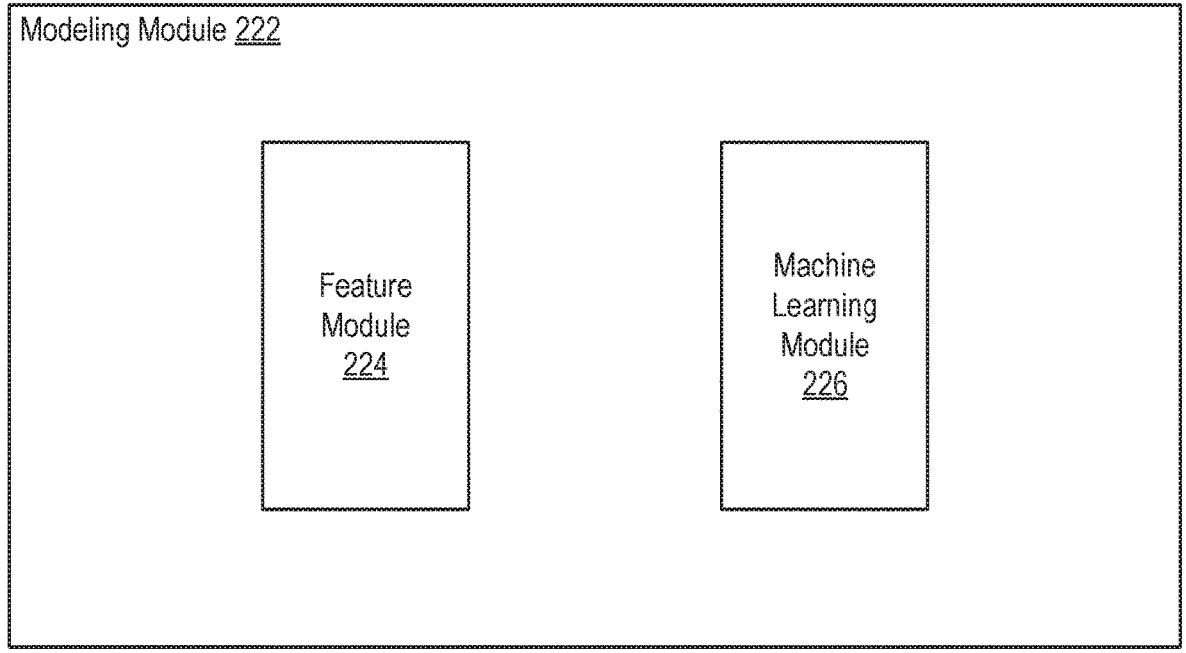
FIG. 2B illustrates an example modeling module configured to facilitate providing data analysis based on applying regression, according to an embodiment of the present disclosure.

FIG. 2B illustrates an example modeling module 222 configured to facilitate providing data analysis based on applying regression, according to an embodiment of the present disclosure. In some embodiments, the modeling module 108 of FIG. 1 can be implemented as the example modeling module 222. As shown in FIG. 2B, the example modeling module 222 can include a feature module 224 and a machine learning module 226.

The modeling module 222 can be configured to facilitate acquiring a set of feature values for a set of features associated with a set of users, as discussed. In some embodiments, the modeling module 222 can utilize the feature module 224 to acquire the set of feature values for the set of features associated with the set of users. In some cases, the feature module 224 can identify, specify, or define (e.g., define previously, predefine, etc.) the set of features. For instance, the set of features can be associated with at least one of a social networking utilization feature (e.g., a feature describing how much time a user spends on a social networking system), a page inventory feature (e.g., a feature providing information regarding how many potentially interesting/relevant pages can be suggested to a user), a page like feature (e.g., a feature describing which and/or how many pages a user has liked, supported, or up-voted), a page access amount feature (e.g., a feature describing how much page content a user has viewed, interacted with, or engaged with), a location feature (e.g., a feature describing a geolocation of a user), or a device feature (e.g., a feature describing a user's device software and/or hardware). It should be understood that many variations are possible.

As discussed previously, the modeling module 222 can be further configured to facilitate applying machine learning to the set of feature values and the set of sensitivity metrics to develop a sensitivity model. In some implementations, the machine learning module 226 can apply or otherwise utilize machine learning to develop the sensitivity model. The machine learning module 226 can, in some cases, utilize machine learning to determine, recognize, identify, or predict, etc., one or more correlations between the set of features and the set of sensitivity metrics. As such, the machine learning module 226 can develop the sensitivity model to be indicative of the one or more correlations between the set of features and the set of sensitivity metrics. For instance, information regarding the one or more correlations can be derived or acquired from the sensitivity model developed or produced by the machine learning module 226. Again, there can be many variations associated with the disclosed technology.

Figure 2C:
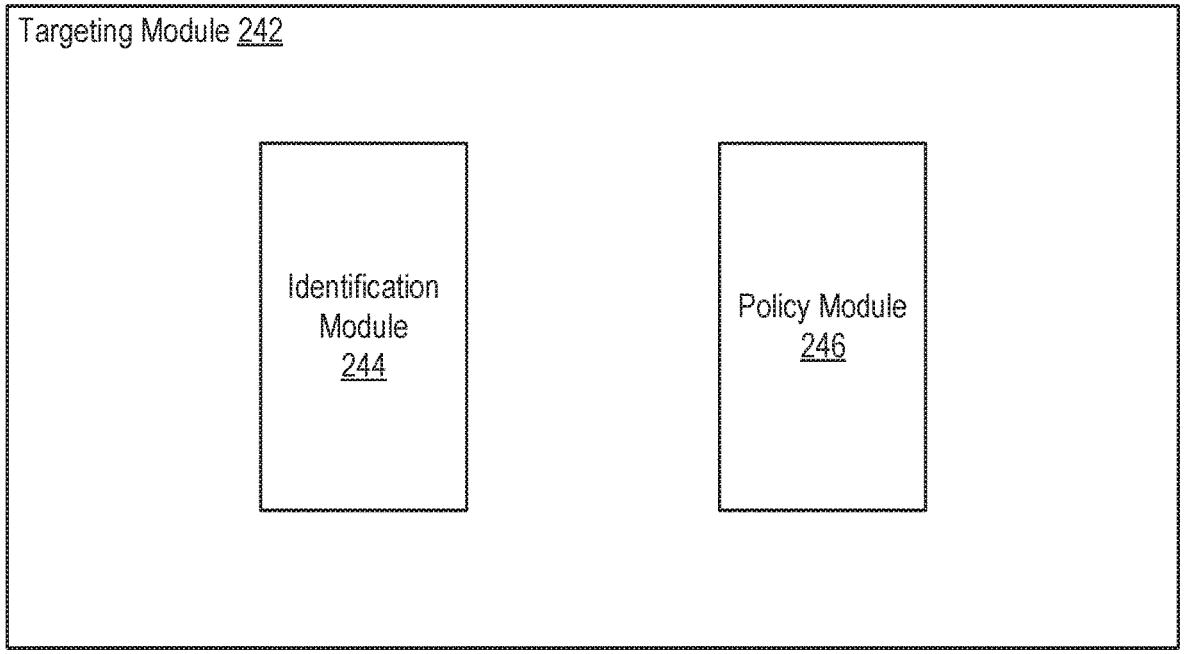
FIG. 2C illustrates an example targeting module configured to facilitate providing data analysis based on applying regression, according to an embodiment of the present disclosure.

FIG. 2C illustrates an example targeting module 242 configured to facilitate providing data analysis based on applying regression, according to an embodiment of the present disclosure. In some embodiments, the targeting module 110 of FIG. 1 can be implemented as the example targeting module 242. As shown in FIG. 2C, the example targeting module 242 can include an identification module 244 and a policy module 246.

As discussed previously, various modules (or one or more portions thereof) of the disclosed technology can be compatible and/or can work in conjunction. In one example, the modeling module 222 of FIG. 2B and the targeting module 242 of FIG. 2C can operate or work together to perform various tasks or processes. In some implementations, the modeling module 222 can facilitate developing a sensitivity model based on applying machine learning to an acquired set of feature values and a determined set of sensitivity metrics. The targeting module 242 can utilize the identification module 244 to facilitate identifying, based on the sensitivity model, one or more target users. The identification module 244 can, in some instances, identify each target user out of the one or more target users based on a respective set of particular feature values associated with each target user. For example, the sensitivity model can be developed to be indicative of correlation(s) between features and sensitivity metrics. As such, in this example, the identification module 244 can utilize information stored via the sensitivity model to recognize that a respective set of particular feature values for a particular target user is associated with at least a threshold likelihood that the particular target user will have at least a specified minimum sensitivity metric. Accordingly, the identification module 244 can identify the particular target user as a suitable candidate, such as a candidate to which a particular rule or policy is to be applied.

The targeting module 242 can utilize the policy module 246 to facilitate applying one or more social networking policies to the one or more target users. In some cases, the policy module 246 can, for instance, cause the one or more social networking policies to be associated with at least one of receiving page suggestions, ranking feed content, interacting with posts, generating posts, interacting with advertisements, or developing social connections. As discussed, it should be understood that all examples herein are provided for illustrative purposes and that many variations associated with the disclosed technology are possible.

Figure 3:
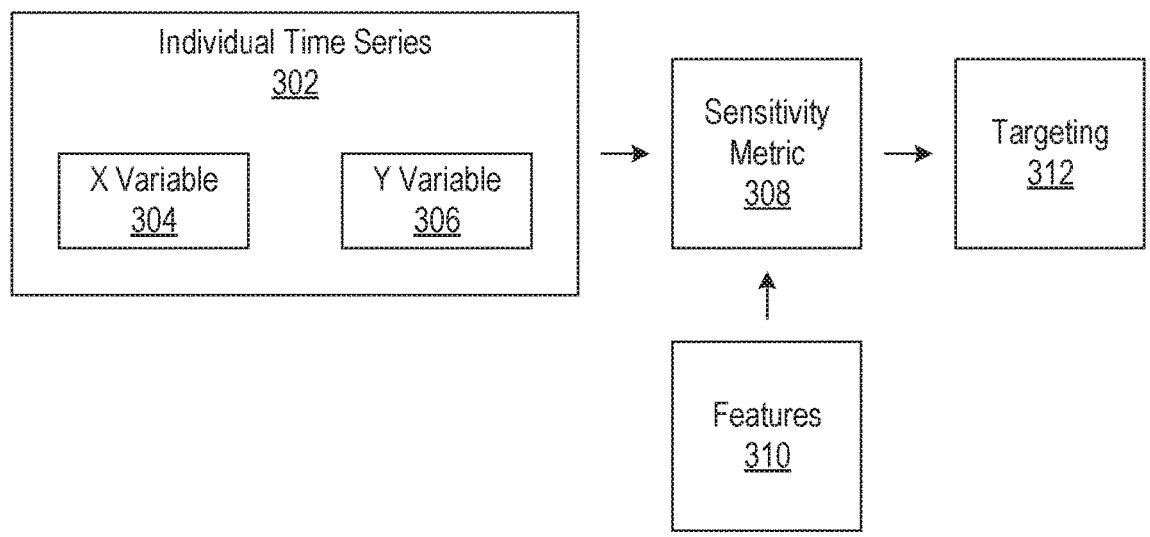
FIG. 3 illustrates an example scenario associated with providing data analysis based on applying regression, according to an embodiment of the present disclosure.

FIG. 3 illustrates an example scenario 300 associated with providing data analysis based on applying regression, according to an embodiment of the present disclosure. As shown in the example scenario 300, individual or personalized time series data points 302 for each of a group of users can be acquired by the disclosed technology. The individual or personalized time series data points 302 can include at least an X variable 304 and a Y variable 306. Moreover, a sensitivity metric 308 can be determined based on one or more regression algorithms. The sensitivity metric 308 can be useful for determining or predicting how one variable affects another variable for each user. In some cases, one or more user features (or values thereof) 310 can be acquired. Machine learning can be utilized to learn or determine correlation(s) between the user features (or user feature values) and sensitivity metrics. As such, based on inputted user features (e.g., user feature values), the disclosed technology can identify target users 312 to whom certain rules or policies are to be applied.

Furthermore, in some embodiments, the example scenario 300 can illustrate a training phase and/or an implementation phase associated with the disclosed technology. For example, the individual time series 302 and/or the acquired features (e.g., feature values) 310 can initially correspond to training data useful for developing a sensitivity model. In this example, subsequent to the sensitivity model being initially developed, the sensitivity model can be utilized for various data analysis purposes (e.g., to make predictions/determinations, to target users, etc.). Moreover, the training phase can continue during the implementation phase, such that the sensitivity model can be further developed or refined over time. As discussed, it is contemplated that all examples herein are provided for illustrative purposes and that many variations associated with the disclosed technology are possible.

Figure 4:
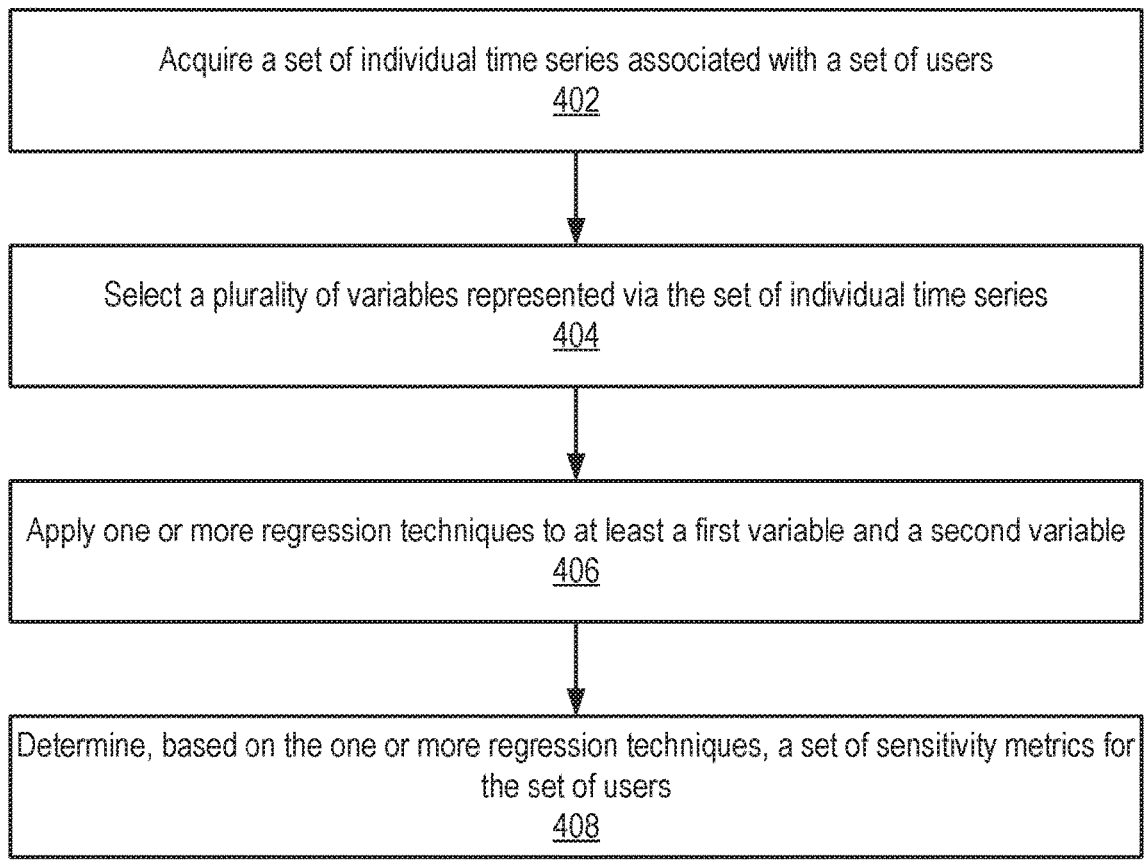
FIG. 4 illustrates an example method associated with providing data analysis based on applying regression, according to an embodiment of the present disclosure.

FIG. 4 illustrates an example method 400 associated with providing data analysis based on applying regression, according to an embodiment of the present disclosure. It should be appreciated that there can be additional, fewer, or alternative steps performed in similar or alternative orders, or in parallel, within the scope of the various embodiments unless otherwise stated.

At block 402, the example method 400 can acquire a set of individual time series associated with a set of users. Each of the individual time series can be associated with a respective user out of the set of the users. At block 404, the example method 400 can select a plurality of variables represented via the set of individual time series. The plurality of variables can include at least a first variable and a second variable. At block 406, the example method 400 can apply one or more regression techniques to at least the first variable and the second variable. At block 408, the example method 400 can determine, based on the one or more regression techniques, a set of sensitivity metrics for the set of users. A respective sensitivity metric out of the set of sensitivity metrics can be determined for each of the users.

Figure 5:
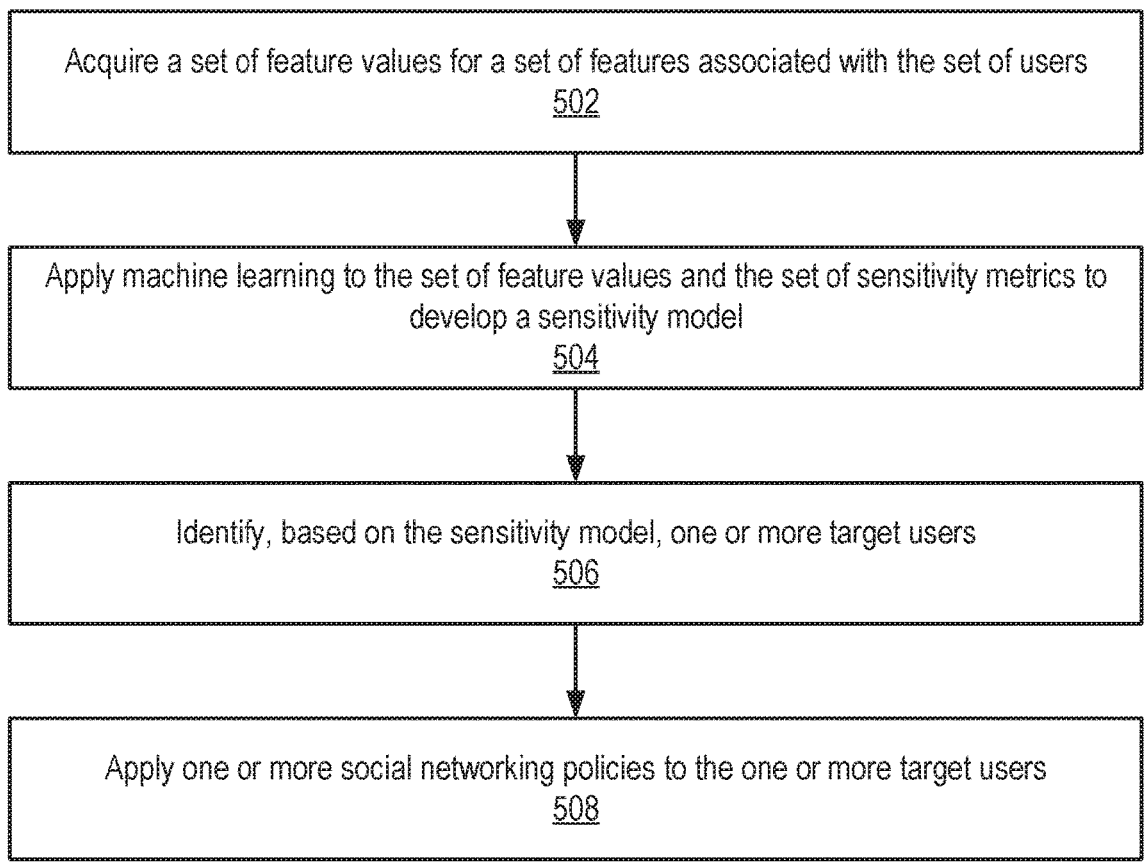
FIG. 5 illustrates an example method associated with providing data analysis based on applying regression, according to an embodiment of the present disclosure.

FIG. 5 illustrates an example method 500 associated with providing data analysis based on applying regression, according to an embodiment of the present disclosure. As discussed, it should be understood that there can be additional, fewer, or alternative steps performed in similar or alternative orders, or in parallel, within the scope of the various embodiments unless otherwise stated.

At block 502, the example method 500 can acquire a set of feature values for a set of features associated with the set of users. At block 504, the example method 500 can apply machine learning to the set of feature values and the set of sensitivity metrics to develop a sensitivity model. At block 506, the example method 500 can identify, based on the sensitivity model, one or more target users. At block 508, the example method 500 can apply one or more social networking policies to the one or more target users.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
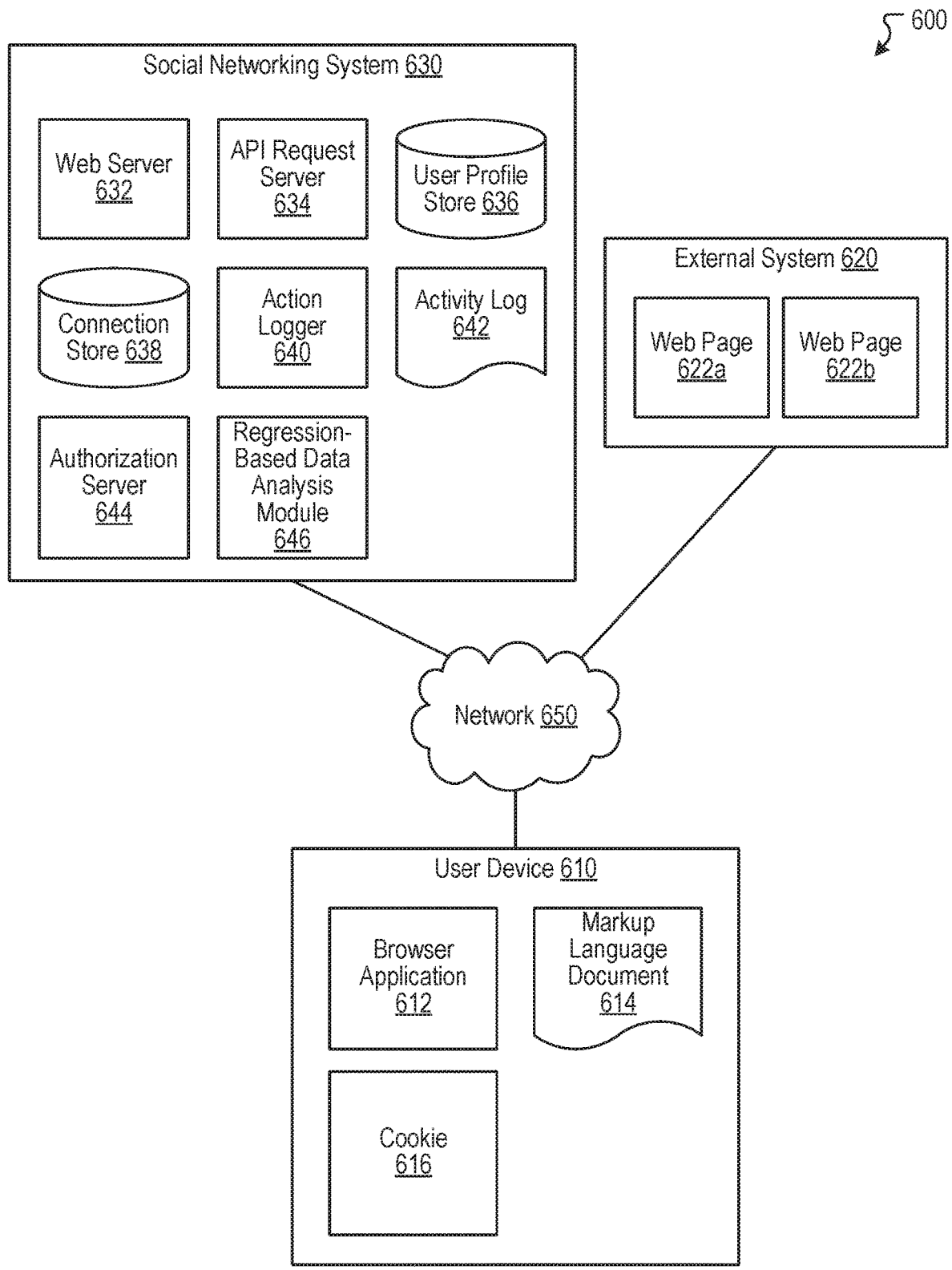
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet. In some embodiments, the social networking system 630 can include or correspond to a social media system (or service).

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11 (e.g., Wi-Fi), worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630.

In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an regression-based data analysis module 646. The regression-based data analysis module 646 can, for example, be implemented as the regression-based data analysis module 102 of FIG. 1. As discussed previously, it should be appreciated that there can be many variations or other possibilities associated with the disclosed technology. For example, in some instances, the regression-based data analysis module (or at least a portion thereof) can be included or implemented in the user device 610. Other features of the regression-based data analysis module 646 are discussed herein in connection with the regression-based data analysis module 102.

Hardware Implementation

Figure 7:
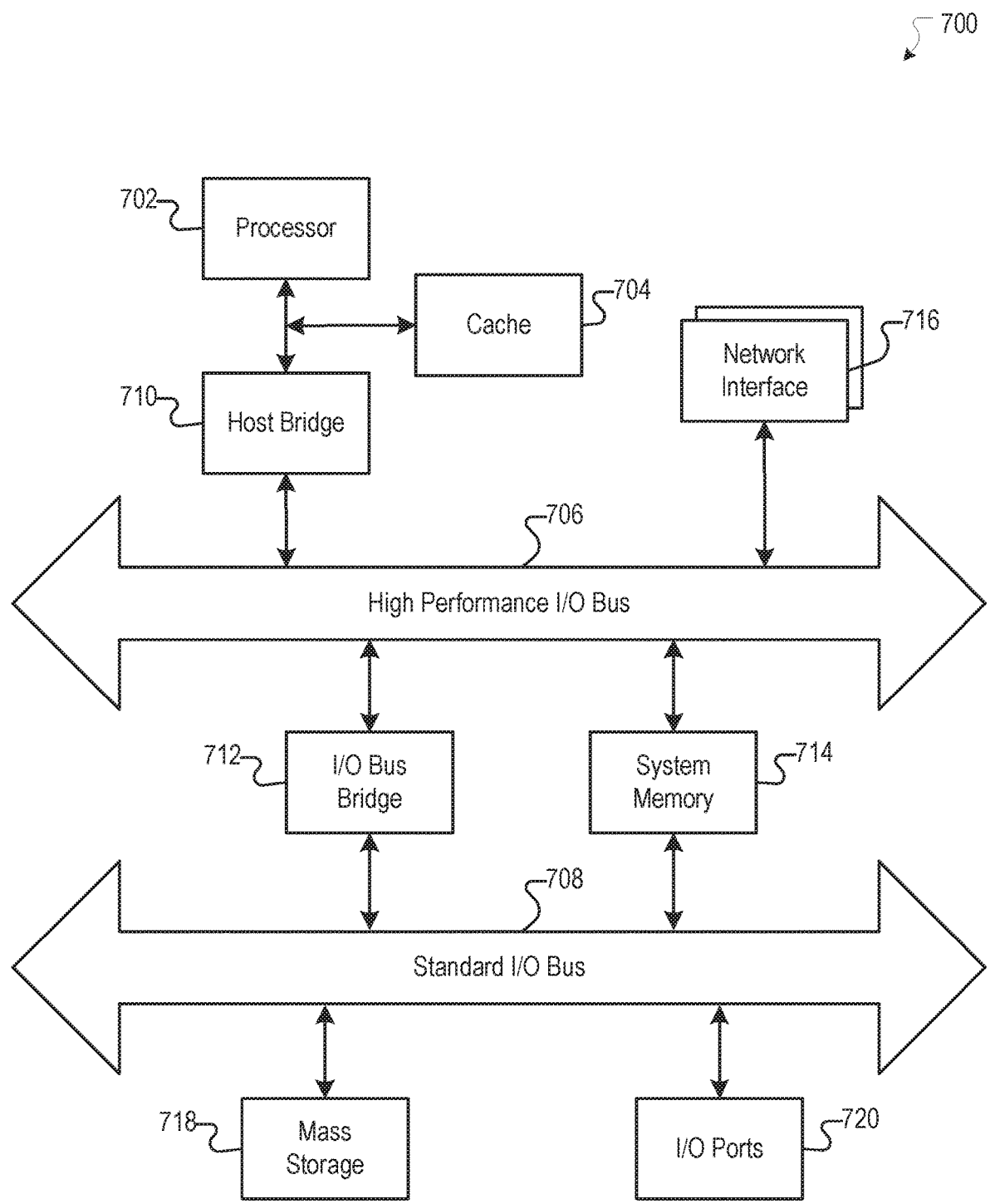
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    acquiring, by a computing system, a set of individual time series associated with a set of users, each of the individual time series being associated with a respective user of the set of the users;
    selecting, by the computing system, a plurality of variables represented via the set of individual time series, the plurality of variables including at least a first variable and a second variable;
    applying, by the computing system, one or more regression techniques to at least the first variable and the second variable;
    determining, by the computing system, based on the one or more regression techniques, a set of sensitivity metrics for the set of users, a respective sensitivity metric out of the set of sensitivity metrics being determined for each of the users;
    training, by the computing system, a sensitivity model based on machine learning to indicate correlations between a set of features associated with a social networking utilization feature and the set of sensitivity metrics, the training based on training data including a set of feature values for the set of features and the set of sensitivity metrics;
    identifying, by the computing system, based on the sensitivity model, one or more target users; and
    applying, by the computing system, one or more social networking policies to the target users, wherein the one or more social networking policies increase engagement by the target users on a social networking system based on actions taken on the social networking system, wherein engagement by the target users is performed through applications running on computing devices associated with the target users in communication with one or more servers associated with the social networking system.

2. The computer-implemented method of claim 1, wherein a target user out of the one or more target users is identified based on a respective set of particular feature values associated with each target user.

3. The computer-implemented method of claim 1, wherein the set of features is further associated with at least one of a page inventory feature, a page like feature, a page access amount feature, a location feature, or a device feature.

4. The computer-implemented method of claim 1, wherein the one or more social networking policies are associated with at least one of receiving page suggestions, ranking feed content, interacting with posts, generating posts, interacting with advertisements, or developing social connections.

5. The computer-implemented method of claim 1, wherein each of the individual time series associated with the respective user out of the set of the users includes social networking behavioral data that is personalized for the respective user over a specified moving time frame.

6. The computer-implemented method of claim 1, wherein each sensitivity metric out of the set of sensitivity metrics corresponds to a respective regression coefficient, for each user out of the set of users, that represents one or more correlations between at least the first variable and the second variable.

7. The computer-implemented method of claim 1, wherein the one or more regression techniques include one or more linear regression processes.

8. A system comprising:
    at least one processor; and
    a memory storing instructions that, when executed by the at least one processor, cause the system to perform:
        acquiring a set of individual time series associated with a set of users, each of the individual time series being associated with a respective user of the set of the users;
        selecting a plurality of variables represented via the set of individual time series, the plurality of variables including at least a first variable and a second variable;
        applying one or more regression techniques to at least the first variable and the second variable;
        determining based on the one or more regression techniques, a set of sensitivity metrics for the set of users, a respective sensitivity metric out of the set of sensitivity metrics being determined for each of the users;
        training a sensitivity model based on machine learning to indicate correlations between a set of features associated with a social networking utilization feature and the set of sensitivity metrics, the training based on training data including a set of feature values for the set of features and the set of sensitivity metrics;
        identifying, based on the sensitivity model, one or more target users; and applying one or more social networking policies to the target users, wherein the one or more social networking policies increase engagement by the target users on a social networking system based on actions taken on the social networking system, wherein engagement by the target users is performed through applications running on computing devices associated with the target users in communication with one or more servers associated with the social networking system.

9. The system of claim 8, wherein each of the individual time series associated with the respective user out of the set of the users includes social networking behavioral data that is personalized for the respective user over a specified moving time frame.

10. The system of claim 8, wherein each sensitivity metric out of the set of sensitivity metrics corresponds to a respective regression coefficient, for each user out of the set of users, that represents one or more correlations between at least the first variable and the second variable.

11. A non-transitory computer-readable storage medium including instructions that, when executed by at least one processor of a computing system, cause the computing system to perform a method comprising:
acquiring a set of individual time series associated with a set of users, each of the individual time series being associated with a respective user of the set of the users;
selecting a plurality of variables represented via the set of individual time series, the plurality of variables including at least a first variable and a second variable;
applying one or more regression techniques to at least the first variable and the second variable;
determining based on the one or more regression techniques, a set of sensitivity metrics for the set of users, a respective sensitivity metric out of the set of sensitivity metrics being determined for each of the users;
training a sensitivity model based on machine learning to indicate correlations between a set of features associated with a social networking utilization feature and the set of sensitivity metrics, the training based on training data including a set of feature values for the set of features and the set of sensitivity metrics;
identifying, based on the sensitivity model, one or more target users; and
applying one or more social networking policies to the target users, wherein the one or more social networking policies increase engagement by the target users on the social networking system based on actions taken on the social networking system, wherein engagement by the target users is performed through applications running on computing devices associated with the target users in communication with one or more servers associated with the social networking system.

12. The non-transitory computer-readable storage medium of claim 11, wherein each of the individual time series associated with the respective user out of the set of the users includes social networking behavioral data that is personalized for the respective user over a specified moving time frame.

13. The non-transitory computer-readable storage medium of claim 11, wherein each sensitivity metric out of the set of sensitivity metrics corresponds to a respective regression coefficient, for each user out of the set of users, that represents one or more correlations between at least the first variable and the second variable.

14. The computer-implemented method of claim 2, wherein the respective set of particular feature values for the target user is associated with at least a threshold likelihood that the target user will have at least a specified minimum sensitivity metric.

15. The computer-implemented method of claim 1, wherein the one or more social networking policies include a policy associated with receipt of page suggestions for a target user.

* * * * *